Figure 1:
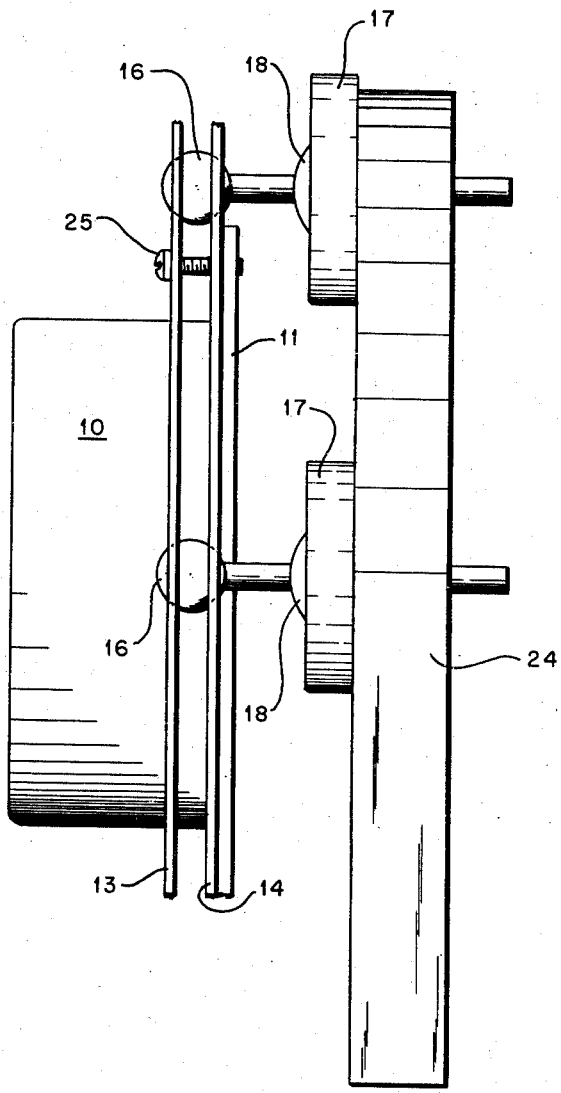

April 29, 1958      F. R. REINERT      2,832,557
RAPID ADJUSTING FOCUS COIL MOUNT Filed March 3, 1954      2 Sheets-Sheet 1

INVENTOR.
FRANCIS R. REINERT
BY
ATTORNEYS

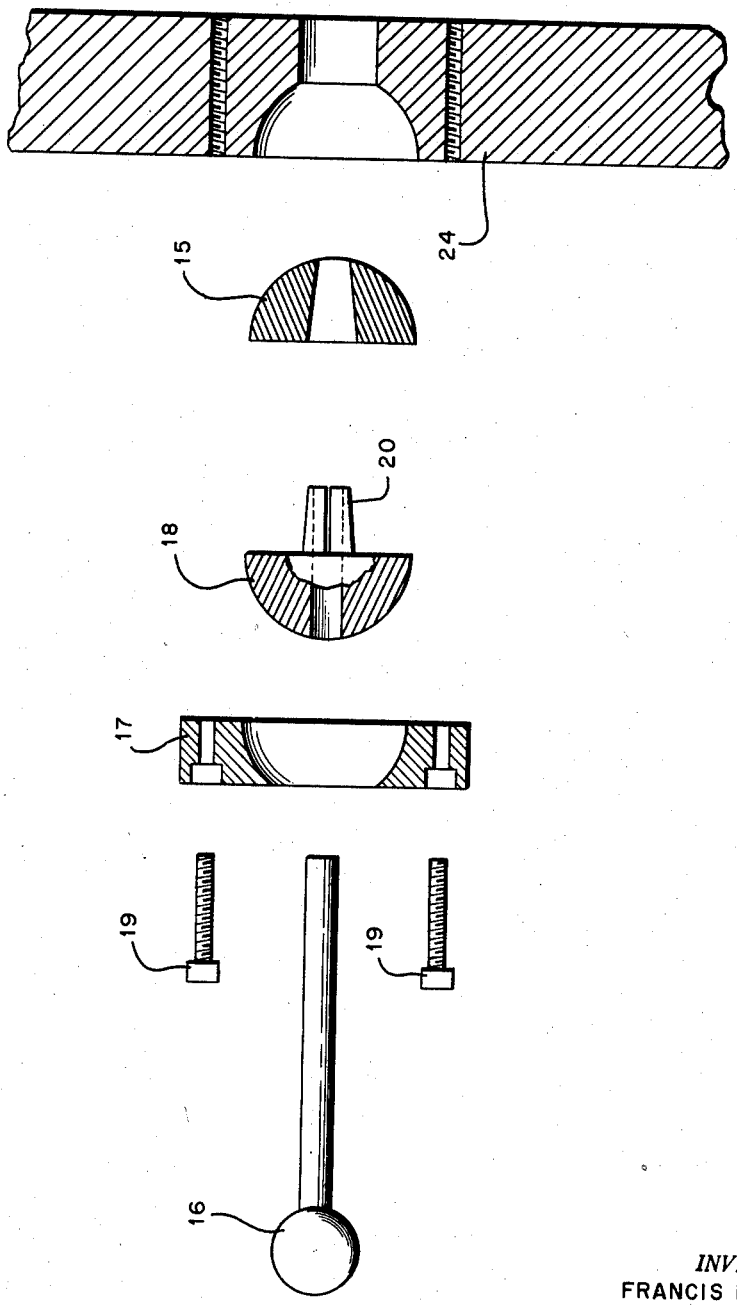

United States Patent Office 2,832,557
Patented Apr. 29, 1958

2,832,557

RAPID ADJUSTING FOCUS COIL MOUNT

Francis R. Reinert, Hatboro, Pa.

Application March 3, 1954, Serial No. 413,975

5 Claims. (Cl. 248—276)

(Granted under Title 35, U. S. Code (1952), sec. 266)

The invention described herein may be manufactured and used by or for the Government of the United States of America for governmental purposes without the payment of any royalties thereon or therefor.

This invention relates to an adjustable mount assembly, more particularly, it relates to a mount assembly providing for support of a mounted article in various planes.

Prior art mount assemblies are subject to the disadvantages that their adjustment requires the manipulation of numerous screws, clamps and other elements. Devices of this type are particularly disadvantageous when adjustment of the mounted article in various planes is required, and are generally unsatisfactory for simultaneous positioning of a mounted article in more than one plane.

It is an object of this invention to provide a mount assembly which permits positioning of the mounted article in various planes with a minimum of adjustment.

It is another object of this invention to provide a mount assembly which permits simultaneous adjustment of the mounted article in more than one plane.

Other objects and many of the attendant advantages of this invention will be readily appreciated as the same becomes better understood by reference to the following detailed description when considered in connection with the accompanying drawings wherein:

Fig. 1 is a front elevational view of the assembled mount showing its application in mounting a television coil, and Fig. 2 is an exploded view of the mount assembly with certain of the parts shown in cross-section.

Referring to Fig. 1, there is shown a television coil 10 mounted approximately parallel to base plate 24 of the mount assembly by means of adapters 13 and 14 secured to flange 11 of the coil 10 by screw 25 and support pins 16 of the mount assembly cooperating with clamping elements 18 and clamping plates 17 of the mount assembly.

Referring to Fig. 2, the support pin 16 which supports the mounted device above the base plate 24 is preferably of cylindrical construction and is provided with a spherical head as shown. The spherical head, when clamped between adapter plates 13 and 14 as shown in Fig. 1 forms a surface which rotates relative to the adapters. Other type adapters or other joints may be used depending upon the type article being supported, the only requirement being that pivotal engagement be present between the adapters and the pins 16. The support pin 16 is rotatably clamped in base plate 24 by means of hemispherical receiving element 15, hemispherical clamping element 18 and securing element 17. The hemispherical clamping element 18 is provided with a bore as shown for receiving the shaft of support pin 16, and a hollow tapered member 20 split as shown to permit expansion as the pin 16 is inserted in it. Hemispherical receiving element 15, which is adapted to fit with clamping section 18 to form a spherically shaped element, is provided with a tapered bore, as shown, adapted to receive the sections of member 20 and ensure clamping engagement of them with pin 16 when it is in mounted position. Base plate 24 is provided with a hemispherically shaped recess as shown to receive the spherical surface of receiving element 15. The recess is provided with a cylindrical bore through said plate from the bottom of said recess, as shown, of larger diameter than pin 16 to permit lateral motion of the pin. The assembled parts with the pin in adjusted position are secured by fastening clamping plate 17 to base plate 24 by means of screws 19 or other convenient means.

The operation of the device as described in connection with the television coil is as follows:

Clamping pins 16 are inserted in holes of a smaller diameter than the spherical heads in adapter plate 14, the adapter 14 is nested on flange 11 of coil 10, adapter plate 13 also having holes substantially of the same size as those in plate 14 is placed over the spherical heads as shown, and the assembly is clamped together by means of screws 25. The pins 16 are next inserted through the hemispherical opening of securing elements 17 and the bores of clamping elements 18, members 20, receiving elements 15 and base plate 24. The securing elements 17 are then secured into position on the base plate 24 by means of screws 19 to complete the assembly. Vertical adjustment of pins 16 is effected after loosening the attachment of securing element 17 to base plate 24, and, correspondingly, the pins are secured by fastening plate 17 firmly to base plate 24, this latter having the effect of clamping the split sections of member 20 against the pin 16. Horizontal movement with respect to the base plate is effected by virtue of the pivotal engagement between adapters 13 and 14 and the pins 16, and pivotal engagement of the hemispherical surfaces of the clamping elements 18 and receiving elements 15 with the surfaces of the hemispherical recesses of securing element 17 and base plate 24 respectively. Rotation of the lower section of pins 16 is provided for by tolerance between the pin and the walls of the cylindrical bore extending from the hemispherically shaped recess in the base plate. It is obvious that simultaneous adjustment of a mounted device in various planes can be accomplished after loosening the securing elements 17 sufficiently to permit movement of the pins relative to the base plate.

It is apparent from inspection of Fig. 1 that the position of the mounted coil can be conveniently adjusted in various planes with reference to the plane of base plate 24. For example, it can be moved horizontally as well as vertically in the same plane as the base plate. By suitably adjusting the support length of selected pins 16 mounted article can be positioned in desired planes angular to the plane of the base plate and moved horizontally in a plane angular to that of the base plate.

The construction of the device permits rapid adjustment to position objects in desired planes with a minimum of manipulation. It is particularly adaptable to longitudinally positioning a television focusing coil with respect to the television tube without improper lateral displacement of the coil with respect to the tube. However, it is by no means limited to this application as many other applications will be readily apparent to those skilled in the art.

Obviously many modifications and variations of the present invention are possible in the light of the above teachings. It is therefore to be understood that within the scope of the appended claims the invention may be practiced otherwise than as specifically described.

What is claimed is:

1. A mount assembly for supporting an object in various planes, comprising: a base plate having therein at least one hemispherically shaped recess provided with a bore extending through said plate from the bottom of said recess; a hemispherical receiving element nesting in said recess and having a tapered bore therethrough and a flat surface; a hemispherical clamping element having a bore therethrough, a flat surface and a split tapered hollow member extending from said flat surface concentric with said latter bore, said clamping element clamped on said receiving element with the flat surfaces of the two hemispherical elements together and said member fitting in said tapered bore; a securing element having a hemispherical recess extending therethrough fitted on said clamping element; means for the attachment of said securing element to said base plate to clamp the assembled receiving and clamping elements in the hemispherical recess of the base plate with the hemispherical surface of the clamping element fitting in the hemispherical recess of the securing element; a support pin clamped in the assembly of the clamping and receiving element with one end extending through the bore in the base plate; and means for rotatably attaching the free end of said support pin to said object to be supported; whereby the body of said support pin is supported by the assembly of clamping element and receiving element, and the assembly is secured to the base plate by the securing element.

2. A mount assembly for supporting an object in various planes, comprising: a base plate having therein at least one hemispherically shaped recess provided with a bore extending through said plate from the bottom of said recess; at least one assembly, including a hemispherical receiving element nesting in said recess and having a tapered bore therethrough and a flat surface; a hemispherical clamping element having a bore therethrough, a flat surface, and a split tapered hollow member extending from said flat surface concentric with said latter bore, said clamping element clamped on said receiving element with the flat surfaces of the two hemispherical elements together and said member fitting in said tapered bore; a securing element having a hemispherical recess extending therethrough fitted on said clamping element; means for the attachment of said securing element to said base plate to clamp the assembled receiving and clamping elements in the hemispherical recess of the base plate with the hemispherical surface of the clamping element fitting in the hemispherical recess of the securing element; a support pin having a spherical head at one end and being clamped in the assembly of clamping and receiving elements with the other end of said support pin extending through the bore in said base plate.

3. A mount assembly for supporting an object in various planes, comprising: a base plate having therein at least one hemispherically shaped recess provided with a bore extending through said plate from the bottom of said recess; a hemispherical receiving element nesting in said recess and having a tapered bore therethrough and a flat surface; a hemispherical clamping element having a bore therethrough, a flat surface, and a split tapered hollow member extending from said flat surface concentric with said tapered bore, said clamping element clamped on said receiving element with the flat surfaces of the two hemispherical elements together and said tapered member fitting in said tapered bore; a securing element having a hemispherical recess extending therethrough fitted on said clamping element; means for the attachment of said securing element to said base plate to clamp the assembled receiving and clamping elements in the hemispherical recess of the base plate with the hemispherical surface of the clamping element fitting in the hemispherical recess of the securing element; a cylindrical support pin having a diameter substantially less than that of the bore in said base plate and provided with a spherical head at one end, said support pin being clamped in the assembly of the clamping and receiving elements with the other end thereof extending through the bore in the base plate; adapter means for holding said object to the spherical head of said support pin; whereby said object is rotatably attached to the spherical head of said support pin through said adapter means and the other end of said support pin is extended through said securing element, said clamping element and said receiving element, and the assembly is secured to the base plate by means of the securing element.

4. A mount assembly for a television focusing coil of the type having a flange extending from its base, comprising: a base plate having therein at least one hemispherically shaped recess provided with a bore extending through said plate from the bottom of said recess; a hemispherical receiving element nesting in each said recess and having a tapered bore therethrough and a flat surface; a hemispherical clamping element for cooperation with each said receiving element, each said clamping element having a bore therethrough, a flat surface, and a split tapered hollow member extending from said latter flat surface concentric with said bore, each said clamping element clamped on the cooperating receiving element with the flat surfaces of the two hemispherical elements together and said tapered member fitting in said tapered bore; a securing element having a hemispherical recess extending therethrough fitted on each said clamping element; means for the attachment of each said securing element to said base plate to clamp the assembled receiving and clamping elements in a hemispherical recess of the base plate with the hemispherical surface of the clamping element fitting in the hemispherical recess of the securing element; at least one cylindrical support pin having a diameter substantially less than that of the cylindrical bore in said base plate and provided with a spherical head at one end, each said support pin clamped in an assembly of said securing, clamping and receiving elements with the second end extending through the bore in the base plate; a first adapter plate secured on top of said flange and provided with at least one hole having a diameter substantially less than that of said spherical head; a second adapter plate of substantially the same construction as said first adapter plate; and means for securing said adapter plates to said flange with each spherical head clamped between said adapter plates and nesting in said holes.

5. A mounting assembly for a television focusing coil of the type having a flange extending from its base, comprising a base plate having therein a plurality of hemispherically shaped recesses provided with bores extending through said plate from the bottoms of said recesses; a plurality of hemispherical receiving elements nesting in the respective recesses each having a tapered bore therethrough and a flat surface; a plurality of hemispherical clamping elements each having a bore therethrough, a flat surface and a split tapered hollow member extending from said latter flat surface concentric with said bore, the respective clamping elements clamped on the respective receiving elements with the flat surfaces of the two hemispherical elements together and said tapered member fitting in said tapered bore; a plurality of securing elements each having a hemispherical recess extending therethrough fitted on the respective elements; means for the attachment of the respective securing elements to said base plate to clamp the assembled receiving end clamping elements in the hemispherical recesses of the base plate with the hemispherical surface of each clamping element fitting in the hemispherical recess of each securing element; a plurality of cylindrical support pins each having a diameter substantially less than that of the cylindrical bores in said base plate and provided with a spherical head at one end, each said support pin clamped in an assembly of said securing, clamping and receiving elements with the second end extending through a bore in the base plate; a first adapter plate secured on top of said flange and provided with a plurality of holes having a diameter substantially less than that of the spherical heads of said support pins; a second adapter plate of substantially the same construction as the first adapter plate; and means for securing said adapter plates to said flange with the spherical heads of the respective support pins clamped between said adapter plates and nesting in said holes.

References Cited in the file of this patent

UNITED STATES PATENTS

| | | |
|---|---|---|
| 362,384 | Johnson | May 3, 1887 |
| 791,251 | Cumming | May 30, 1905 |
| 967,877 | Bauer | Aug. 23, 1910 |
| 2,238,029 | Barr | Apr. 15, 1941 |
| 2,404,243 | Moynihan | July 16, 1946 |
| 2,650,788 | Halstein | Sept. 1, 1953 |

FOREIGN PATENTS

| | | |
|---|---|---|
| 635,871 | Germany | 1936 |
| 1,011,841 | France | 1952 |